United States Patent
Gabas

(10) Patent No.: US 6,863,162 B1
(45) Date of Patent: Mar. 8, 2005

(54) ELECTRIC PARKING BRAKE

(75) Inventor: Carlos Gabas, Barcelona (ES)

(73) Assignee: FICO Cables, S.A., Rubi (Barcelona) (ES)

( * ) Notice: Subject to any disclaimer, the term of this patent is extended or adjusted under 35 U.S.C. 154(b) by 681 days.

(21) Appl. No.: 09/293,923

(22) Filed: Apr. 16, 1999

(30) Foreign Application Priority Data

Apr. 23, 1998 (DE) .......................................... 198 18 339

(51) Int. Cl.⁷ .......................... F16D 65/36; H01H 47/22
(52) U.S. Cl. ...................... 188/2 D; 188/156; 307/10.2
(58) Field of Search ................................. 188/265, 202, 188/156, 258, 2 D; 307/10.2, 10.3, 10.4, 10.5

(56) References Cited

U.S. PATENT DOCUMENTS

| | | | |
|---|---|---|---|
| 4,261,614 A | * | 4/1981 | Rice ............................ 269/171 |
| 4,519,653 A | * | 5/1985 | Smith .......................... 303/89 |
| 4,561,527 A | | 12/1985 | Nakamoto et al. |
| 4,817,463 A | * | 4/1989 | Cameron .................. 74/781 R |
| 5,100,106 A | * | 3/1992 | Denman et al. ............. 254/323 |
| 5,570,756 A | * | 11/1996 | Hatcher ....................... 180/287 |
| 5,590,744 A | * | 1/1997 | Belmond ..................... 188/265 |
| 5,925,940 A | * | 7/1999 | Donnatelle et al. ........ 307/10.2 |
| 6,107,695 A | * | 8/2000 | Denz et al. ................ 307/10.5 |
| 6,172,430 B1 | * | 1/2001 | Schmitz et al. ............ 307/10.2 |

FOREIGN PATENT DOCUMENTS

| | | |
|---|---|---|
| DE | 1 694 261 | 3/1955 |
| DE | 31 13 362 A1 | 10/1982 |
| EP | 0 754 610 A1 | 1/1997 |
| JP | 10-331884 | * 12/1998 |

* cited by examiner

Primary Examiner—Xuan Lan Nguyen
(74) Attorney, Agent, or Firm—Renner, Otto, Boisselle & Sklar, LLP

(57) ABSTRACT

An electric parking brake for a vehicle, comprising a winch having a rotation axis, an electrical motor for turning the winch, and two braking cables fixed to the circumference of the winch on opposite sides, so that under a rotation of the winch segments of essentially equal length of the braking cables are wrapped onto the winch. The winch is disposed in a housing having oppositely disposed exit openings through which the cables pass, respectively, and tapered side walls for guiding the cables from the circumference of the winch to the exit openings.

9 Claims, 5 Drawing Sheets

ELECTRIC PARKING BRAKE

1. TECHNICAL FIELD

Figure 1:
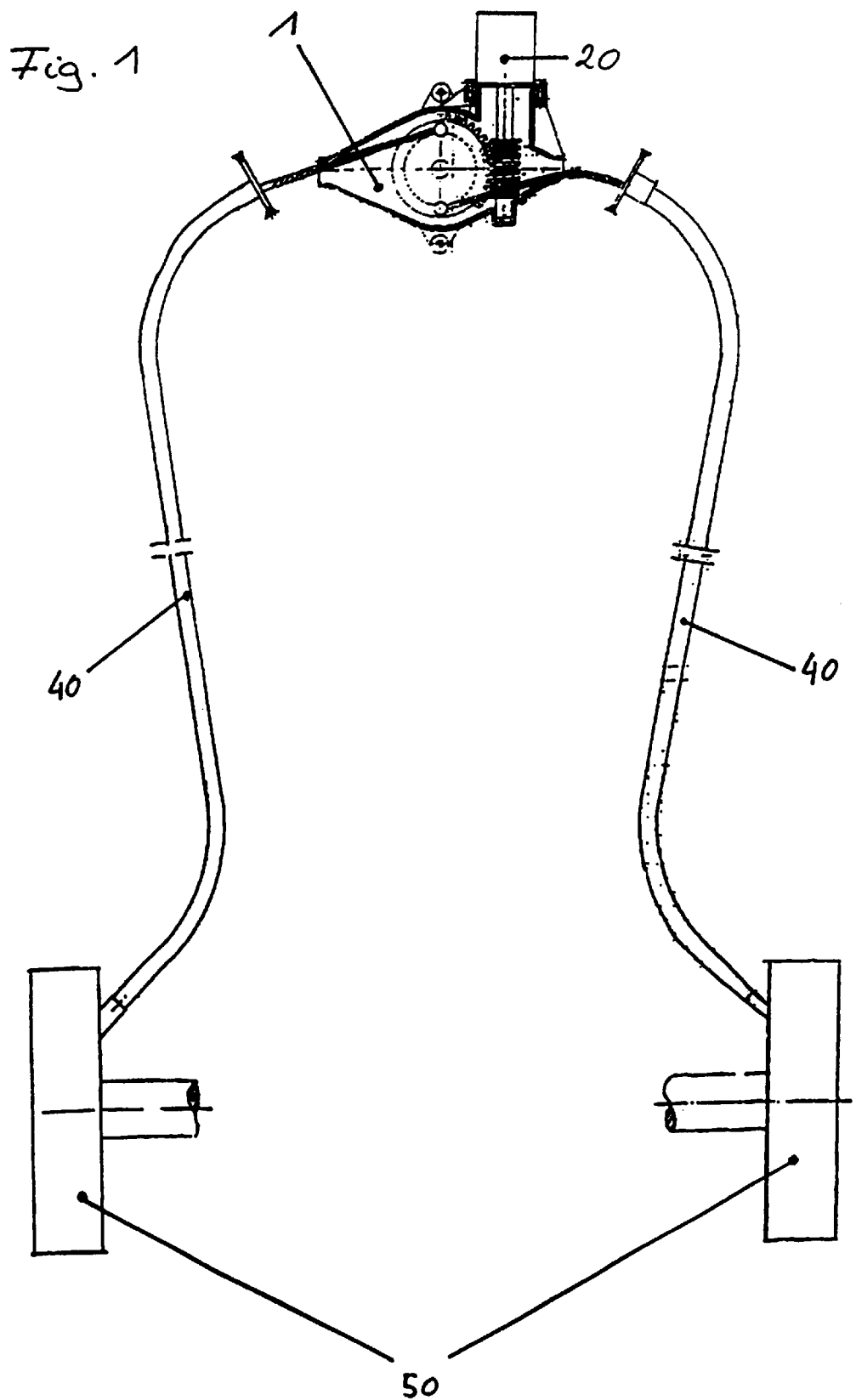

The present invention relates to an electric parking brake for a vehicle. It relates in particular to an electric parking brake which rolls by means of an electrical motor the cables of the brake up a winch.

2. THE PRIOR ART

Vehicles like cars or utility vehicles of all kinds comprise usually at least two independent braking systems. The first braking system which is controlled with the foot and which operates often with hydraulics serves to slow down the driving vehicle. The second system which is manually operated serves apart from a security function, if the first system fails, to avoid a non-intended rolling away of the parked vehicle.

Such parking brakes according to the prior art comprise usually a lever and two cables, which transmit the movement of the lever to the brakes mounted to the rear wheels. The lever of the parking brake comprises usually a latching mechanism for the fixation of the applied brake, so that the brake does not disengage and the vehicle rolls away.

Nevertheless, accidents happen when parked vehicles start to roll away on steep roads, since it is often forgotten to apply the parking brake when the car is parked. Further, children remaining in a car may disengage the mechanical parking brake and thereby cause considerable dangers.

Furthermore, parking brakes according to the prior art may be disengaged by any unauthorized user of the vehicle without any problems, so that such brakes can not provide any protection against theft. This is important, since after the invention of an electronic engine immobilizer vehicles are less and less stolen by shorting the ignition and driving away but by towing the vehicle away or pulling it onto a loading area of a lorry.

To avoid these disadvantages electrically operated parking brakes have been suggested in the prior art, which transform the rotation of the axis of an electrical motor into a pulling movement of the cables of the parking brake. Constructions are know where the axis of the electrical motor comprises threads onto which a tube with internal threads is mounted, which is in turn connected to one or more cables. A turning of the axis leads to a forward or backward directed movement of the tube and thereby of the braking cable. The disadvantage of this arrangement is that the considerable stress provided by the braking cables acts directly on the axis of the electrical motor so that expensive special types of electrical motors are necessary which can resist such a stress over many years.

Further, constructions are known where two sliders to which the outer ends of the braking cables are fixed, are moved by means of a belt drive, if the belt is rolled up a winch which is mounted on the axis of an electrical motor. Apart from its complexity this arrangement has the important disadvantage with respect to its wear resistance, that the lifetime of a belt is limited.

The disadvantages of the described approaches have led to the fact that up to now inspite of the great need electric parking brakes have not been accepted in the automotive field.

It is therefore the problem of the present invention to provide a parking brake which increases the security of the vehicle with respect to an unintended operation and theft and which is also more comfortable to use. It is a further problem of the present invention to provide a simple, stable and long lasting mechanism for an electric parking brake which effectively transforms the rotation of an axis of an electrical motor into a pulling movement of two braking cables. Finally, it is the problem of the invention to provide a new security system for a vehicle.

3. SUMMARY OF THE INVENTION

The above mentioned problems are solved according to the invention by a parking brake according to claim 1. The inventive concept on which the invention is based, is to transform the rotational movement of a winch driven preferably by an electrical motor in a translational movement of the braking cables which are tangentially connected to the winch.

In detail, the present invention relates to an electric parking brake for a vehicle, where an electrical motor drives a winch having two braking cables fixed on opposite sides of its circumference, so that under rotation of the winch simultaneously segments of equal length of the two braking cables are rolled up the winch. Preferably, the two braking cables are tangentially connected to the winch in the starting position and the brake is applied after a quarter of a turn of the winch.

Preferably, the winch comprises a part which is shaped like a gear and which interacts with a worm drive on the axis of the electrical motor. The axis of the winch is preferably vertically oriented in the car and the axis of the electrical motor is preferably horizontally oriented. The winch and the worm drive are preferably arranged inside a housing, into which the two braking cables are inserted from opposite sides.

According to a second aspect, the invention relates to a security system of a vehicle, which comprises an electronic engine immobilizer and an electric parking brake, preferably a parking brake according to claim 1.

4. SHORT DESCRIPTION OF THE DRAWING

Figure 2:
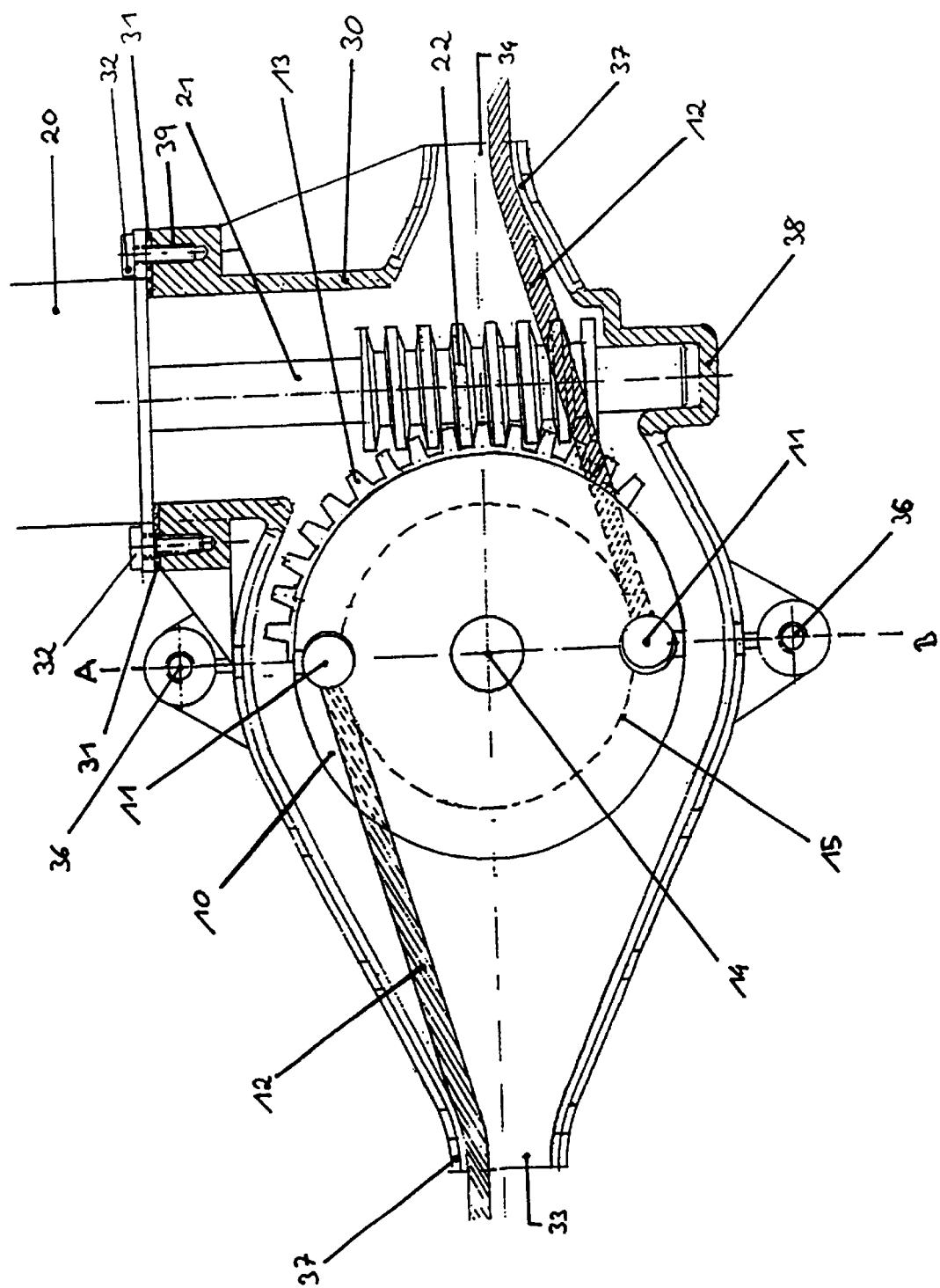
Figure 3:
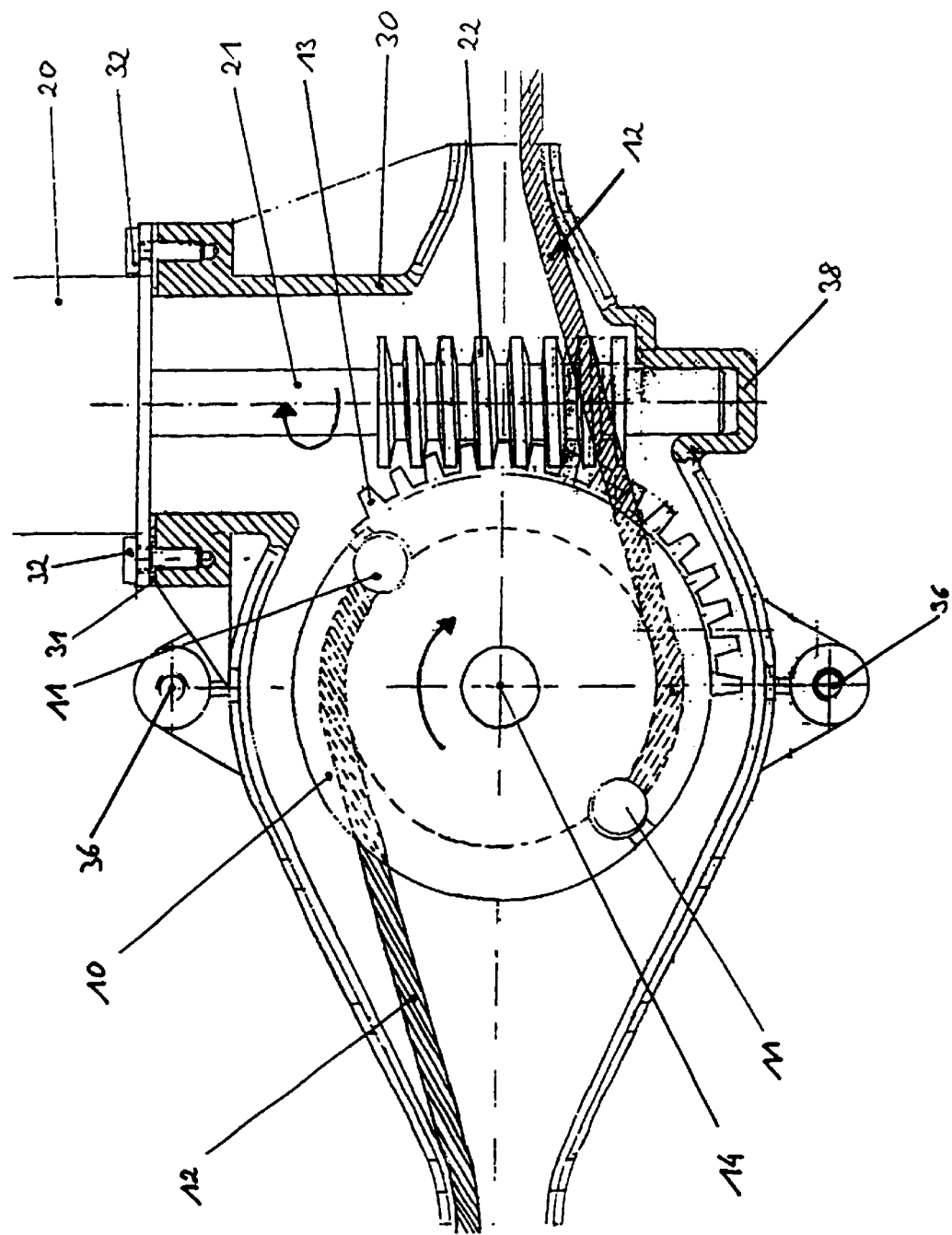
Figure 4:
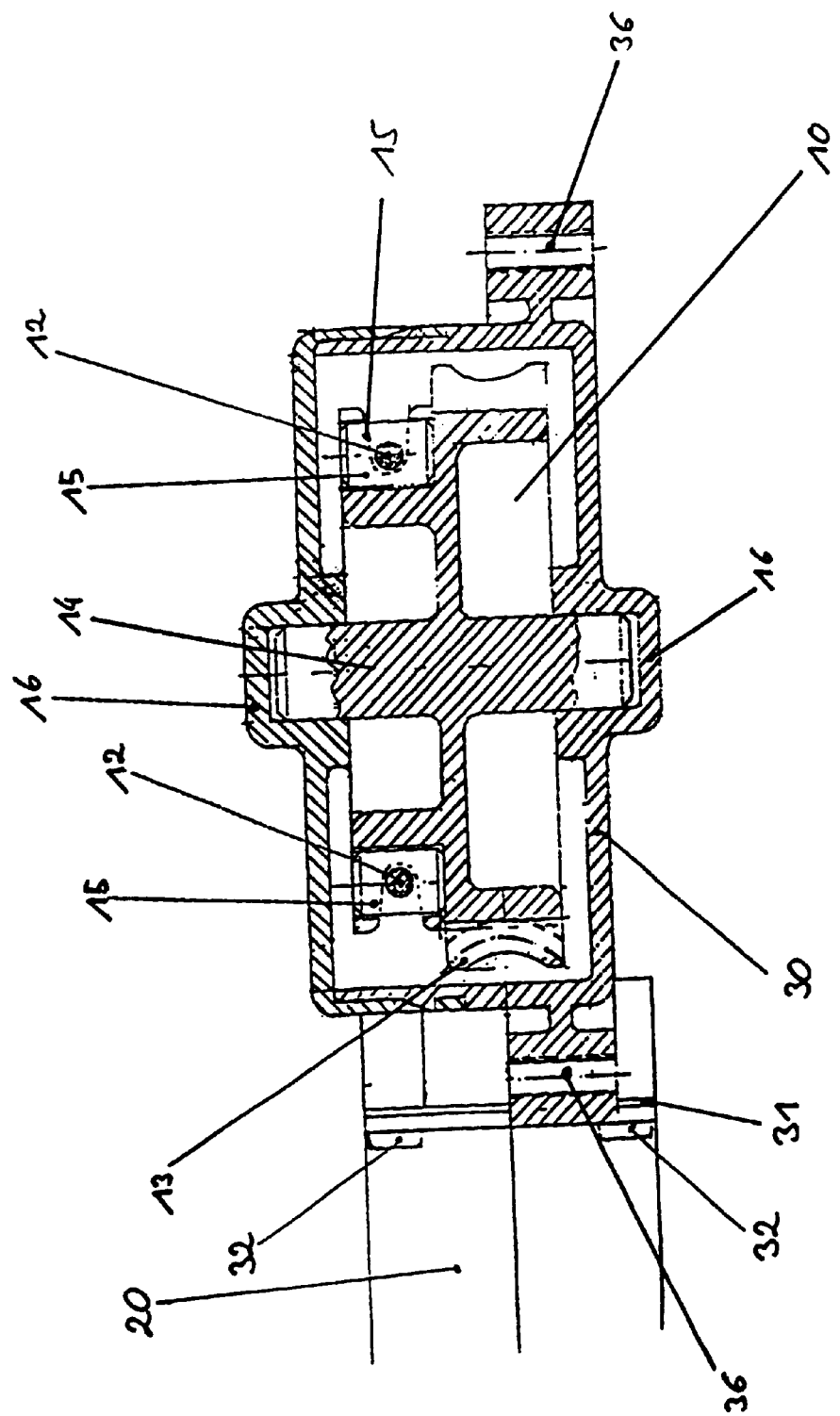

In the following detailed description, a presently preferred embodiment of the present invention is discussed with reference to the drawing which shows:

FIG. 1: A general view of the parking brake according to the invention comprising a motor 20, a pulling unit 1, braking cables 40 and the schematically drawn wheels 50;

FIG. 2: A detailed view of the pulling unit 1 for transforming the rotation of the axis of the electrical motor 20 into a pulling movement of the braking cables 40 in the starting position in a partial cross-section;

FIG. 3: A detailed view of a partial cross-section of the pulling unit when the parking brake is applied;

FIG. 4: A side view of the pulling unit according to a cross-section along the line A-B in FIG. 2.

Figure 5:
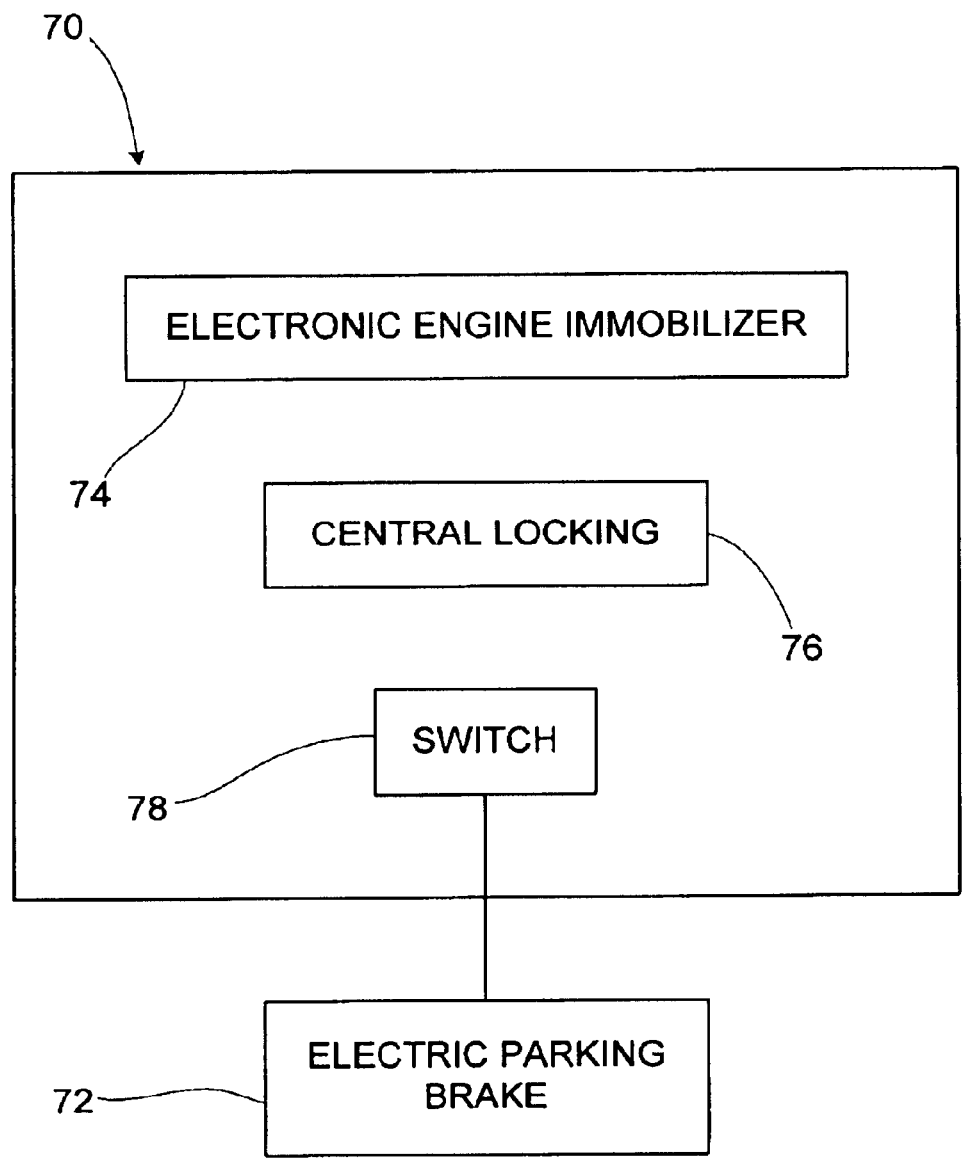

FIG. 5: A diagrammatic illustration of an electronically controlled security system of a vehicle according to the invention.

5. DETAILED DESCRIPTION OF THE INVENTION

With reference to FIG. 1 the electric parking brake comprises an electrical motor 20 and a pulling unit 1, which transforms the rotation of the axis of the electrical motor into a pulling movement of the braking cables 40 serving to operate the brakes at the two wheels 50. As required, disk brakes, drum brakes or any other type can be used which can be operated by braking cables.

According to FIG. 2, the pulling unit 1 comprises a housing 30 in which a winch 10 is rotatably arranged on an axis 14. On opposite sides of the winch 10 two cables 12 are mounted to the winch 10 by two pins 11. The connection between the cables 12 and the pins 11 may be achieved by welding, squeezing or similar techniques. In the starting position, when the parking brake is not applied, the two cables 12 are preferably tangentially oriented with respect to the winch 10.

Preferably, the winch includes on one of its sides an area 13, which is gear-like shaped and which interacts with a worm drive 22 on the axis 21 of an electrical motor 20. The axis 21 is to this end vertically oriented with respect to the axis 14 of the winch 10. This arrangement leads to a comparatively flat and space-saving construction of the electric parking brake.

A rotation of the axis 21 leads via the worm drive 22 and the gear like area 13 to a rotation of the winch 10. As shown in FIG. 3, segments of equal length of the two cables 12 are simultaneously rolled onto the winch 10 and the brake is thereby applied. The cables are arranged in a groove 15 of the winch 10 (cf.

FIG. 4).

As can be seen from FIG. 4, the groove 15 is arranged above the gear like area 13. The diameter of the winch 10 is preferably dimensioned so that the brake is applied after less than a quarter of a turn (cf. FIG. 3). According to another embodiment (not shown) the winch is shaped so that for each cable 12 a separate groove 15 is provided. In this case the winch 10 may be turned more than 90° for applying the brake, without any interference of the two cables.

According to a further embodiment (not shown) the winch 10 is not driven by a worm drive but by a gear on the axis 21 of the electrical motor 20. To this end the axis 14 of the winch 10 and the axis 21 of the electrical motor are parallel oriented in this embodiment. Whereas in such a case the transformation of the rotation into the pulling movement is determined by the relative sizes of the gears, in the embodiment shown in FIG. 2. the pitch of the worm drive 22 is decisive for the ratio of transmission.

With reference to FIG. 2, the housing 30 comprises on opposite sides two openings 33, 34 through which the cables 12 are inserted. The edges 37 of the openings 33 and 34 are rounded off to avoid any damage to the cables 12. The housing further comprises two feet 36 to connect the electric parking brake to the frame of the vehicle. On the one side, the housing 30 comprises borings 39 which are used to mount the electrical motor with bolts 32.

For damping the electrical motor against shocks and vibrations which may arise during the operation of the vehicle small rubber elements 31 are arranged between the motor and the housing. At the side of the housing which is opposite to the motor a recess 38 for the bearing of the axis of the motor is provided. Ball or slide bearings can be inserted here, as well as for the bearings 16 of the axis 14 of the winch 10 in the upper and lower part of the housing 30 (cf. FIG. 4), as required.

The described invention has apart from its simple construction the great advantage that the axis 21 of the electrical motor 20 is not subjected to any stress. The electrical motor 20 therefore does not have to fulfill any special requirements but must only provide a sufficient torque to operate the brake or to keep it in an applied position. Further, the axis 14 of the winch 10 is also not subjected to a special strain, since the pulling forces of the two cables 12 compensate each other.

Finally, since no wearing parts are necessary, a stable and long lasting electric parking brake is provided.

For the cost efficient manufacture of the electric parking brake preferably plastic materials, in particular polyamide or metals are used, depending on the mechanical stress on the respective part. Since the pins 11 for the fixation of the cables to the winch 10 are subjected to a high stress, they are preferably made out of metal. For the winch 10 and for the worm drive 22 both materials are possible, whereas the housing 30 is preferably made out of plastic and the screws 32 for mounting the motor are preferably made out of metal.

According to another aspect of the invention and as illustrated in FIG. 5, the present electric parking brake is integrated into the electronically controlled security system 70 of a vehicle. This security system 70 comprises preferably apart from the electric parking brake 72 an electronic engine immobilizer 74 and a central locking 76 for the doors of the vehicle. According to a preferred embodiment, the electric parking brake is automatically applied together with the electronic engine immobilizer when the ignition key is removed, so that the vehicle cannot be moved by any unauthorized person once it is parked.

When the vehicle is unlocked, the parking brake 72 remains preferably applied so that the vehicle cannot roll away on a steep road, until the electronic engine immobilizer 74 has been disengaged by the ignition key and a switch 78 for disengaging the brake has been pushed.

Apart from an improved protection against theft also an unintended rolling away of the parked vehicle is avoided, since the parking brake is automatically applied if the ignition key is removed and the electronic engine immobilizer is engaged.

Therefore, the described security system considerably reduces the risks of accidents or theft for a parked vehicle.

What is claimed is:

1. An electric parking brake for a vehicle, comprising:
   a winch having a rotation axis,
   an electrical motor for turning the winch, the electric motor having a rotary shaft perpendicular to the rotation axis of the winch,
   two braking cables fixed to the circumference of the winch on opposite sides, so that under a rotation of the winch from an initial disengaged position to an engaged position, segments of essentially equal length of the braking cables are wrapped onto the winch, and
   a gear rotatably driven by the rotary shaft of the electric motor and engaged with the winch along a diameter centrally disposed between the opposite sides of the winch to which the braking cables are fixed when the winch is in said initial disengaged position, and wherein the rotary shaft is substantially orthogonal with respect to the braking cables.

2. The electric parking brake according to claim 1, wherein the gear rotatably driven by the electric motor is a worm drive on the axis of the electrical motor, and the winch comprises an area which is shaped like a gear and which interacts with the worm drive.

3. The electric parking brake according to claim 1, comprising:
   a housing in which the winch is disposed, the housing having oppositely disposed exit openings through which the cables pass, respectively, and tapered side walls for guiding the cables from the circumference of the winch to the exit openings.

4. The electric parking brake according to claim 3, wherein the braking cables are tangentially oriented with respect to the winch when in a starting position.

5. The electric parking brake according to claim 4, wherein each cable is connected to a respective brake, and the brake is applied after less than a quarter of a turn of the winch.

6. The electric parking brake according to claim 3, wherein the gear rotatably driven by the electric motor is a worm drive on the axis of the electrical motor, and the winch has an area which is shaped like a gear and which interacts with the worm drive.

7. The electric parking brake according to claim 6, configured for mounting in a vehicle such that the axis of the winch is vertically oriented in the mounted state and where the axis of the electrical motor is horizontally oriented.

8. The electric parking brake according to claim 6, wherein the winch and the worm drive are arranged inside the housing into which the two braking cables extend from opposite sides.

9. The electric parking brake according to claim 1, comprising:

a housing in which the winch is disposed, the housing having oppositely disposed exit openings through which the cables pass, respectively, and wherein the openings are diametrically aligned with respect to the rotation axis of the winch.

* * * * *